US012483310B2

(12) United States Patent
Suh et al.

(10) Patent No.: US 12,483,310 B2
(45) Date of Patent: Nov. 25, 2025

(54) NULL DATA PACKET ANNOUNCEMENT (NDPA) FRAME INDICATION (71) Applicant: HUAWEI TECHNOLOGIES CO., LTD., Shenzhen (CN)

(72) Inventors: Jung Hoon Suh, Kanata (CA); Yan Xin, Kanata (CA); Osama Aboul-Magd, Kanata (CA); Kwok Shum Au, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 18/107,568

(22) Filed: Feb. 9, 2023

(65) Prior Publication Data
US 2023/0261713 A1 Aug. 17, 2023

Related U.S. Application Data

(60) Provisional application No. 63/311,227, filed on Feb. 17, 2022.

(51) Int. Cl.
*H04B 7/06* (2006.01)
*H04L 5/00* (2006.01)

(52) U.S. Cl.
CPC ......... *H04B 7/0626* (2013.01); *H04L 5/0048* (2013.01)

(58) Field of Classification Search
CPC .... H04L 5/0048; H04L 5/0057; H04B 7/0626
See application file for complete search history.

(56) References Cited

U.S. PATENT DOCUMENTS

| 8,971,303 | B2 | 3/2015 | Lee et al. |
| 10,020,919 | B2 | 7/2018 | Lee et al. |
| 10,924,955 | B2 | 2/2021 | Lim et al. |
| 2011/0199946 | A1 | 8/2011 | Breit et al. |
| 2016/0262051 | A1 | 9/2016 | Merlin et al. |
| 2017/0111148 | A1* | 4/2017 | Park ............... H04L 5/0048 |
| 2019/0132155 | A1* | 5/2019 | Jiang ............... H04W 74/08 |
| 2019/0349067 | A1 | 11/2019 | Huang et al. |

(Continued)

FOREIGN PATENT DOCUMENTS

| CN | 103141044 A | 6/2013 |
| CN | 107667497 A | 2/2018 |

(Continued)

OTHER PUBLICATIONS

Francois Verges, The 802.11AX Trigger Frame (Year: 2019).*

(Continued)

*Primary Examiner* — Sulaiman Nooristany (57) ABSTRACT

A method includes sending, by an access point (AP) to one or more stations (STAs), a request for channel state information (CSI). The request includes a null data packet announcement (NDPA) frame including a common information field. The common information field including an indicator of whether trigger based (TB) sounding or non-trigger based (non-TB) is being used. Then, the method includes receiving, by the AP from the one or more STAs, a CSI feedback response based on the request. The common information field may be a null data packet announcement (NDPA) variant field in an alternative name and the indicator may utilize 1 bit.

12 Claims, 12 Drawing Sheets

(56) References Cited

U.S. PATENT DOCUMENTS

| | | | |
|---|---|---|---|
| 2020/0068655 A1* | 2/2020 | Ghosh | H04W 84/12 |
| 2020/0132857 A1 | 4/2020 | Berger et al. | |
| 2020/0274588 A1 | 8/2020 | Jiang et al. | |
| 2020/0358486 A1 | 11/2020 | Suh | |
| 2021/0336752 A1 | 10/2021 | Kwon et al. | |
| 2022/0038241 A1 | 2/2022 | Vermani et al. | |
| 2022/0070710 A1 | 3/2022 | Lim et al. | |
| 2022/0158696 A1* | 5/2022 | Jeon | H04B 7/0404 |
| 2023/0300649 A1 | 9/2023 | Mei et al. | |
| 2024/0072863 A1 | 2/2024 | Suh et al. | |

FOREIGN PATENT DOCUMENTS

| | | |
|---|---|---|
| EP | 3133762 A1 | 2/2017 |
| EP | 3866505 A1 | 8/2021 |
| WO | 2021175124 A1 | 9/2021 |
| WO | WO-2023123000 A1 * | 7/2023 |

OTHER PUBLICATIONS

IEEE Std 802.11ax—IEEE Standard for Information Technology—Telecommunications and Information Exchange between Systems—Local and Metropolitan Area Networks—Specific Requirements, Part 11: Wireless LAN Medium Access Control, (MAC) and Physical Layer (PHY) Specifications, Amendment 1: Enhancements for High-Efficiency WLAN, 2021.

IEEE P802.11be—IEEE P802.11be™/D3.0 Draft Standard for Information technology—Telecommunications and information exchange between systems Local and metropolitan area networks—Specific requirements Part 11: Wireless LAN Medium Access Control, (MAC) and Physical Layer (PHY) Specifications, Amendment 8: Enhancements for extremely high throughput (EHT), Jan. 2023.

IEEE 802.11-20/0062/r0, BW Negotiation, TXOP Protection with >160MHz PPDU and Puncture Operation, Jan. 6, 2020.

J. Suh, et. al., "NDPA for Sensing", TGbf, 21/1896r2, Nov. 2021 (IEEE 802.11-21).

J. Suh, et. al., "Parameters for sub-7 GHz Sensing NDPA", TGbf, 22/1535r1, Jan. 2022 (IEEE 802.11-22).

Wook Bong Lee et al. IEEE P802.11 Wireless LANs, D0.3 CR for Spatial Stream And MIMO Enhancement, IEEE 802.11-21/0272r4, Feb. 18, 2021, total 30 pages.

* cited by examiner

NULL DATA PACKET ANNOUNCEMENT (NDPA) FRAME INDICATION

CROSS-REFERENCE TO RELATED APPLICATIONS

This application claims the benefit of priority to U.S. provisional Patent Application No. 63/311,227 filed on Feb. 17, 2022, entitled "NULL DATA PACKET ANNOUNCEMENT (NDPA) FRAME INDICATION", the contents of which are incorporated herein by reference in their entirety.

FIELD OF THE INVENTION

The present invention pertains to the field of communication networks, and in particular to a method and a frame format related to NDPA frame indications.

BACKGROUND

The existing Null Data Packet Announcement (NDPA) frame format in the IEEE 802.11be (11be) Draft standards may indicate a limited number of NDPA variants. Existing NDPA frames may be used to indicate a number of communications parameters involving stations (STA) and sounding parameters used to configure and tune communications channels.

Many wireless local area network (WLAN) devices include multiple antennas and implement multiple-input and multiple-output (MIMO) techniques in order to improve system throughput. The ability to effectively communicate relies on acquiring accurate channel state information (CSI) that describes the properties of the communication link. During a channel sounding process, a sequence of data is transmitted to the responder on the target channel. Based on the received signal, the responder estimates the CSI and sends this information back to the transmitter. Both trigger based (TB) sounding and non-trigger based (non-TB) sounding may be used.

During the channel sounding process, parameters such as transmit (Tx) Power for a responder or Feedback Bandwidth may be sent in the station (STA) Info field of a Trigger Frame following a Null Data Packet (NDP) for the case of TB sounding. In the case of non-TB sounding, Tx Power for a responder can be indicated in a common field, or the Feedback Bandwidth parameters can be aligned with the bandwidth of the NDPA and NDP frames. This can lead to the case where redundant information is sent in STA Info fields leading to inefficiencies.

Therefore, there is a need for a method and a frame format that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

The present disclosure provides methods and apparatus related to using a common information field of an NDPA frame to indicate if TB sounding or non-TB sounding is being used. In embodiments, a one-bit TB/non-TB Sounding Indication bit may be added to a common field of the NDPA frame. In this way, the NDPA can differentiate between the TB Sounding case and the non-TB Sounding case. In further embodiments some parameters such as the Tx Power or Feedback Bandwidth, currently communicated in STA Info fields, may be split into other fields such as the common info field or into a frame such as a Trigger frame or a Measurement Set-up frame.

A first aspect of the disclosure may provide for a method including sending, by an access point (AP) to one or more stations (STAs), a request for channel state information (CSI), where the request includes a null data packet announcement (NDPA) frame. The NDPA frame includes a common information field including an indicator of whether trigger based (TB) sounding or non-trigger based (non-TB) is being used. Then the method includes receiving, by the AP from the one or more STAs, a CSI feedback response based on the request.

In some embodiments the common information field is a null data packet announcement (NDPA) variant field.

In some embodiments, the indicator utilizes 1 bit.

According to a second aspect, an apparatus is provided, where the apparatus includes: a memory, configured to store a program; a processor, configured to execute the program stored in the memory, and when the program stored in the memory is executed, the processor is configured to perform the methods in the first aspect described herein. The apparatus may be an access point (AP).

According to a third aspect, a computer readable medium is provided, where the computer readable medium stores program code executed by a device, and the program code is used to perform the methods in the first aspect described herein. The device may be a processor, CPU, controller, etc. of an access point (AP).

According to a fourth aspect, a chip is provided, where the chip includes a processor and a data interface, and the processor reads, by using the data interface, an instruction stored in a memory, to perform the methods in the first aspect described herein. The chip may be a processor, controller, etc. of an access point (AP).

Other aspects of the disclosure provide for apparatus, and systems configured to implement the methods disclosed herein. For example, wireless stations (STAs) and access points (APs) can be configured with machine readable memory containing instructions, which when executed by the processors of these devices, configures the devices to perform the methods disclosed herein.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Channel State Information (CSI) capabilities were first introduced in the IEEE 802.11n standard in the context of multiple-input and multiple-output (MIMO) capabilities. The CSI training sequence, as may be appreciated by a person skilled in the art, may be designed to measure the channel characteristics between a transmitter and a receiver. CSI may represent how an electromagnetic signal propagates from a transmitter to a receiver and the combined effect of scattering, fading, and power decay with distance of the signal.

CSI may reflect the wireless signal propagation characteristics for a link from a transmitter to a receiver at certain carrier frequencies. Sounding procedures may be used to perform CSI measurements and the procedures may differ depending on if a trigger based (TB) or non-trigger based (non-TB) sounding procedure is used. Embodiments described herein provide methods and apparatus related to using a common information field of an NDPA frame to indicate if TB sounding or non-TB sounding is being used.

In embodiments, a one-bit TB/non-TB Sounding Indication bit may be added to a common field of the NDPA frame. In this way, the NDPA can differentiate between the TB Sounding case and the non-TB Sounding case. In further embodiments some parameters such as the Tx Power or Feedback Bandwidth, currently communicated in STA Info fields, may be split into other fields such as the common info field or into a frame such as a Trigger frame or a Measurement Set-up frame.

Figure 1:
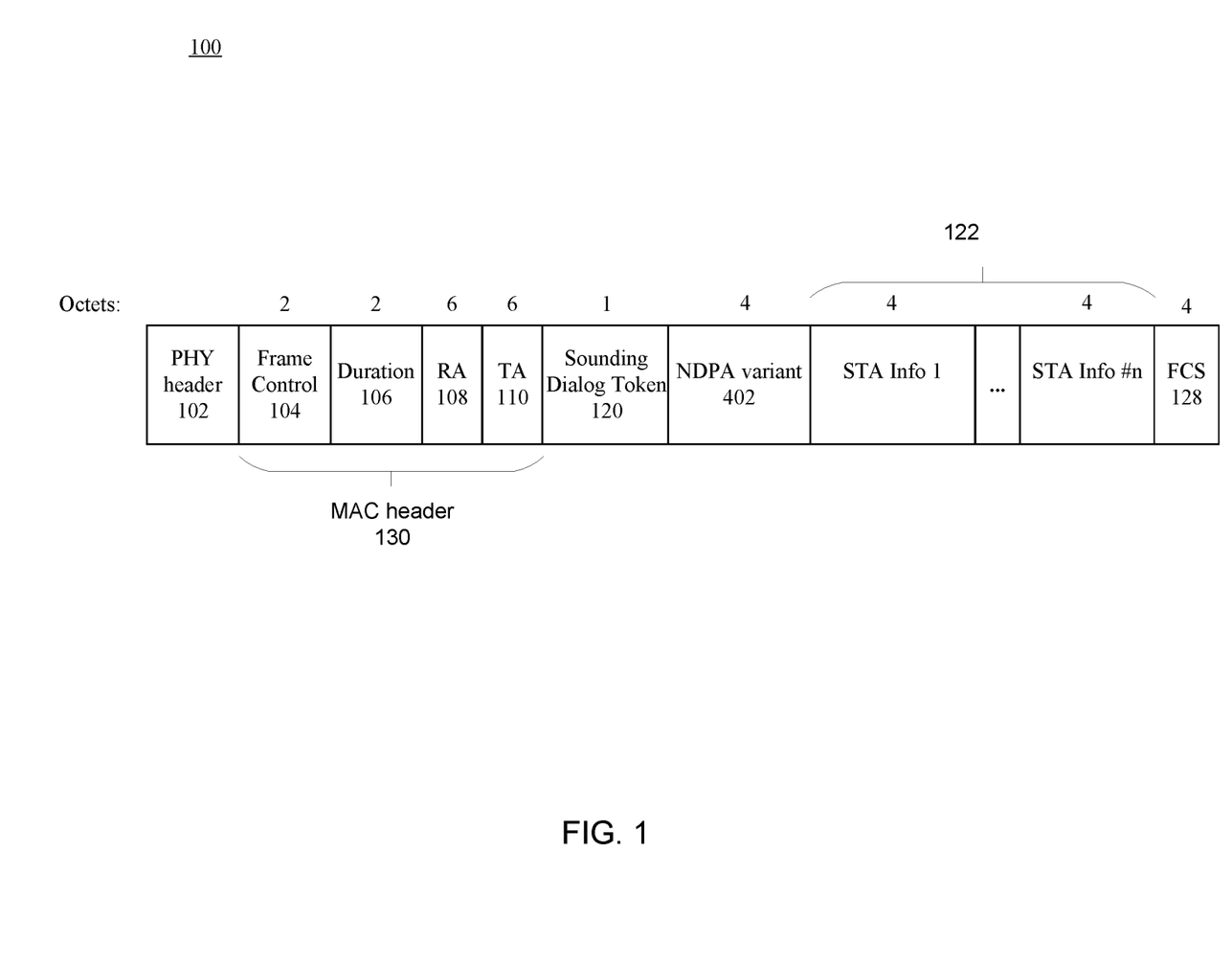
FIG. 1 illustrates an NDPA frame format, according to an embodiment.

FIG. 1 illustrates an NDPA frame format according to an embodiment. The NDPA frame format 100 comprises fields including: physical layer (PHY) header 102, frame control 104, duration 106, receiver address (RA) 108, transmitter address (TA) 110, sounding dialog token 120, NDPA variant 402, one or more station (STA) information 122 (e.g., STA Info 1, . . . , STA Info n) and frame check sequence (FCS) 128. Referring to NDPA frame format 100, the portion of the frame including the frame control field 104, the duration field 106, the RA field 110 and the TA field 110 may be referred to as the MAC header 130.

Each field of the frame format 100 is allocated a certain size. The frame control field 104 and the duration field are each assigned 2 octets. The RA field 108 and the TA field 110 are each assigned 6 octets. The sounding dialog token field 120 is assigned 1 octet. The NDPA variant field and each of the STA info field (e.g., STA Info 1, . . . , STA Info n) may be assigned 4 octets. And the FCS field is assigned 4 octets. Each octet is 8 bits or 1 byte.

In embodiments, the NDPA variant field 402 may be used to indicate information that is common to all STAs, while each STA Info field 122 may be used to indicate information that is relevant to individual STAs. The NDPA variant field 402 may alternately be referred to as a "Common Info" field or as a "Special STA Info" field.

Figure 2:
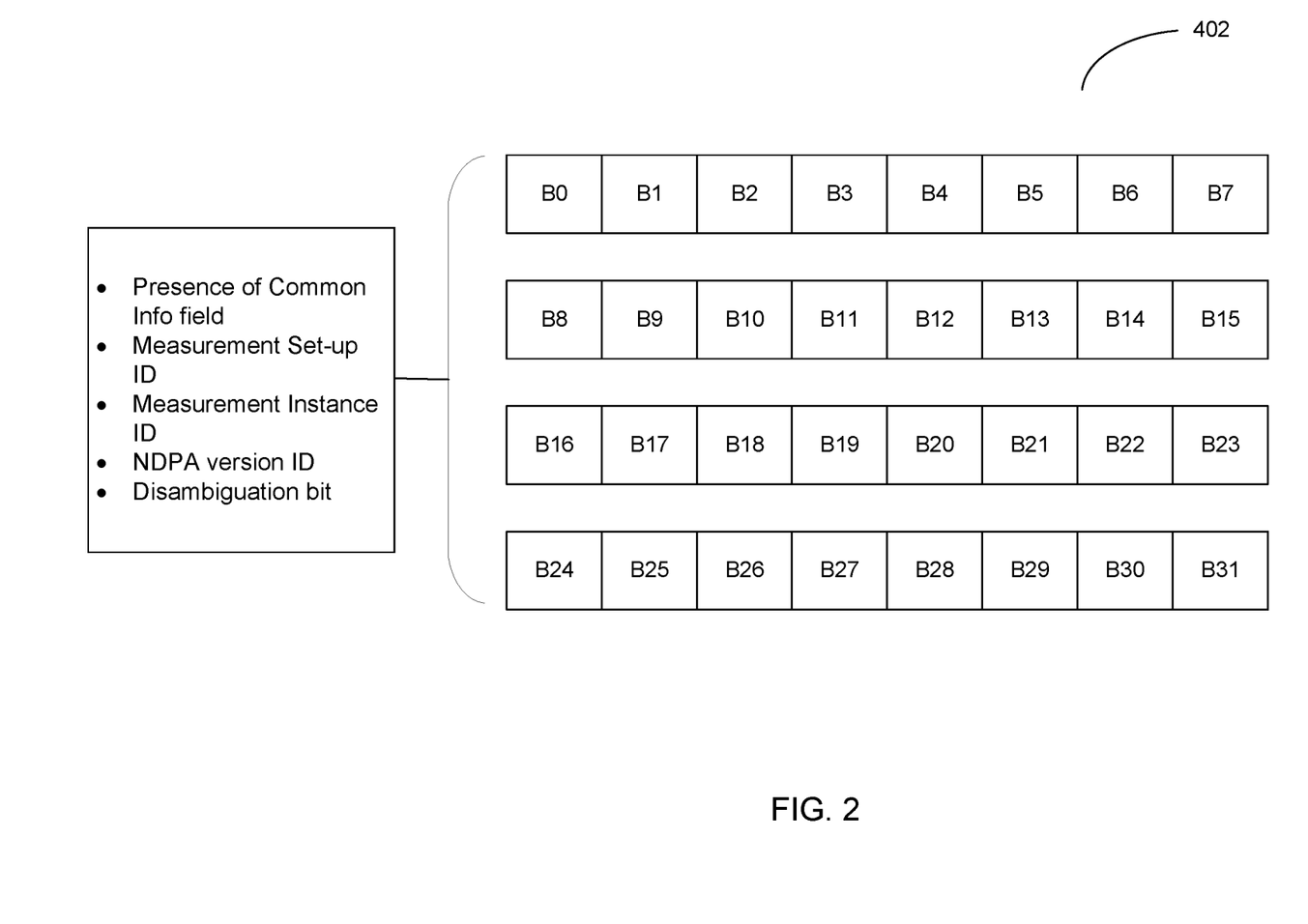
FIG. 2 illustrates common information that may be carried in the NDPA variant field according to an embodiment.

FIG. 2 illustrates common information that may be carried in the NDPA variant field 402 according to an embodiment. A "Presence of Common Info" subfield may be used to indicate if the NDPA variant field 402 is present. If the NDPA variant field 402 is not present, it may be replaced by, or used as a STA info field 122. In embodiments where the NDPA variant field 402 is used as a Special STA Info field, a dummy Association ID (AID) may be used to indicate the Presence of Common Info subfield. A Measurement Set-up ID field in the Common Info field may be used to indicate the Measurement Set-up ID of the NDPA frame. A Sounding Dialog Token Number may be used to indicate a Measurement Instance ID. In embodiments, the Measurement Instance ID may be carried in a Common Info field as well. A NDPA Version ID and a Disambiguation bit may also be included. The Disambiguation bit may include 1 bit for every two bytes after the first 2 bytes in case of Special STA Info field or, for other cases 1 bit for every two bytes.

Figure 3:
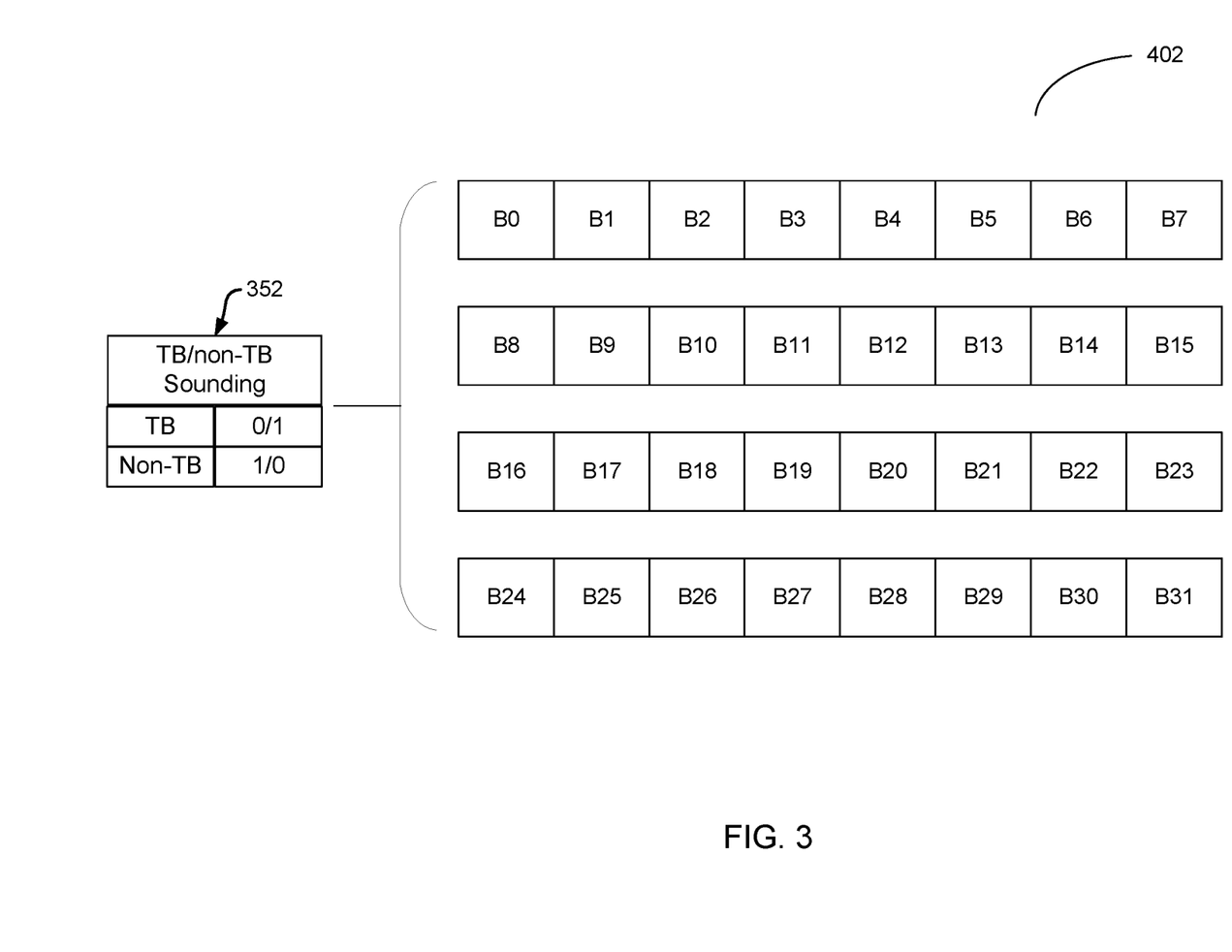
FIG. 3 illustrates a TB/non-TB Sounding bit included in an NDPA variant field, according to an embodiment.
Figure 4:
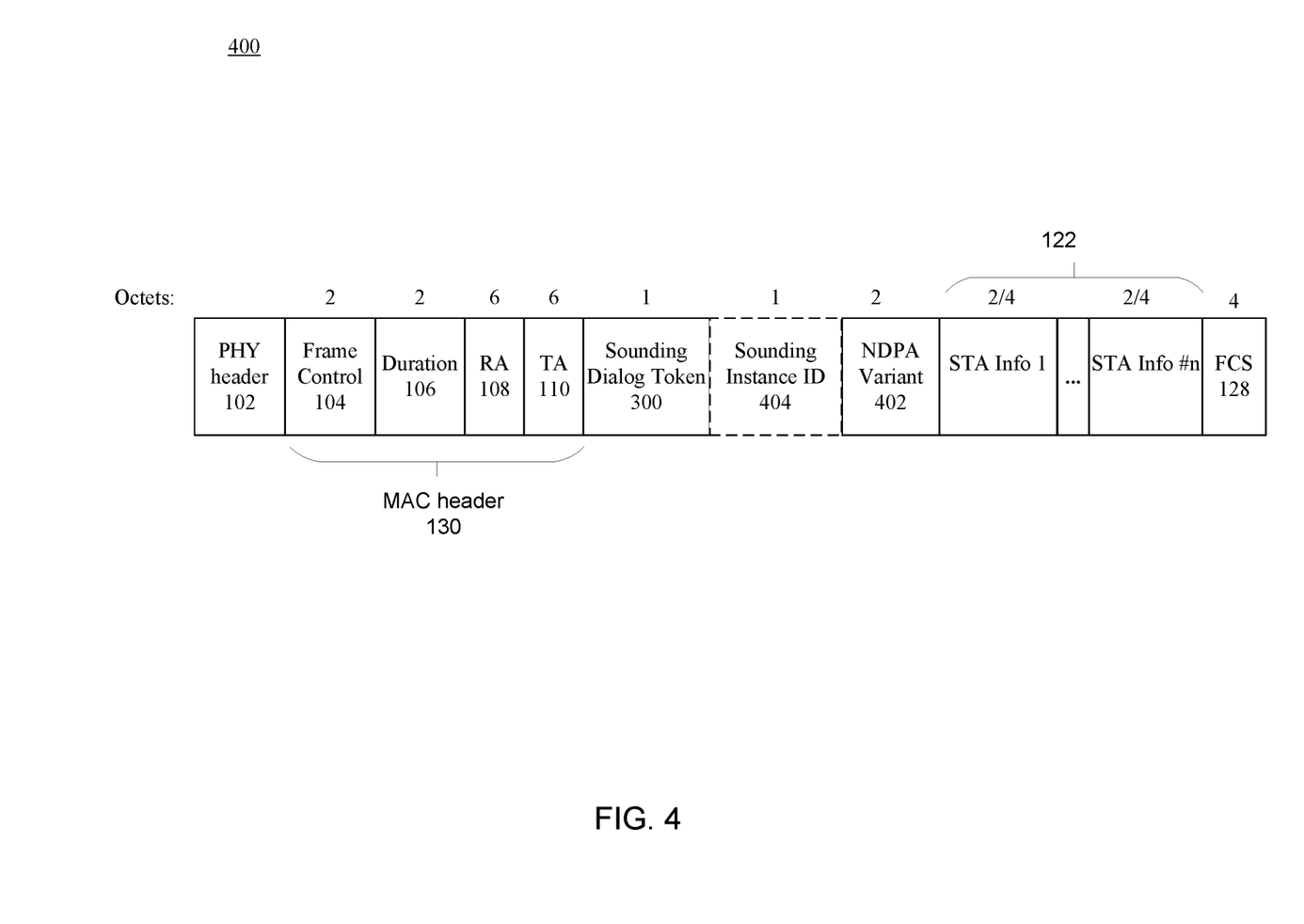
FIG. 4 illustrates an example of an alternative NDPA frame format, according to an embodiment of the present disclosure.

FIG. 3 illustrates how a TB/non-TB Sounding bit 352 may be included in an NDPA variant field 402, according to an embodiment. A one bit TB/non-TB Sounding Indication bit 352 may be included in the NDPA variant field 402 to allow an NDPA frame 100 to indicate if TB Sounding or non-TB Sounding is being used. The indication may also allow some information and parameters, such as the Tx Power or the Feedback Bandwidth to be moved from a STA Info field 122, to some other field such as a common information field, or to another frame such as Trigger frame or Measurement Set-up frame. A single bit may be used to indicate the TB Sounding NDPA or non-TB Sounding NDPA, however more bits may also be used to encode the two possibilities, as is known in the art. In embodiments, a "0" may be used to indicate the TB sounding case and a "1" may be used to indicate the non-TB sounding case. Alternatively, a "1" may be used to indicate the TB sounding case and a "0" may be used to indicate the non-TB sounding case FIG. 4 illustrates an example of an alternative NDPA frame format, according to an embodiment of the present disclosure. The enhanced NDPA frame format 400 may comprise one or more fields including: PHY header 102, frame control 104, duration 106, RA 108, TA 110, sounding dialog token 300, NDPA variant 402, one or more STA information 122 (e.g., STA information 1, . . . , station information n) and FCS 128. The NDPA variant field 402 may be 2 bytes in some embodiments, though other sizes (e.g., 4 bytes etc.) may also be appropriate as appreciated by a person skilled in the art.

In some embodiments, the indication of the presence of the NDPA variant field (via the 6 bits, B2 to B7 of the sounding dialog token field 300) may further indicate the presence of another field (in addition to the NDPA variant field), which may be referred to as sounding instance identifier (ID) field 404. As illustrated, the sounding instance ID 404 may be between the sounding dialog token field 300 and the NDPA variant field 402. The sounding instance ID 404 may indicate sounding dialog token number information. In such embodiments, the NDPA variant field 402 need not indicate sounding dialog token ID information if the sounding Instance ID 404 provides such information. In some embodiments, the sounding instance ID 404 may be 1 byte.

Figure 5:
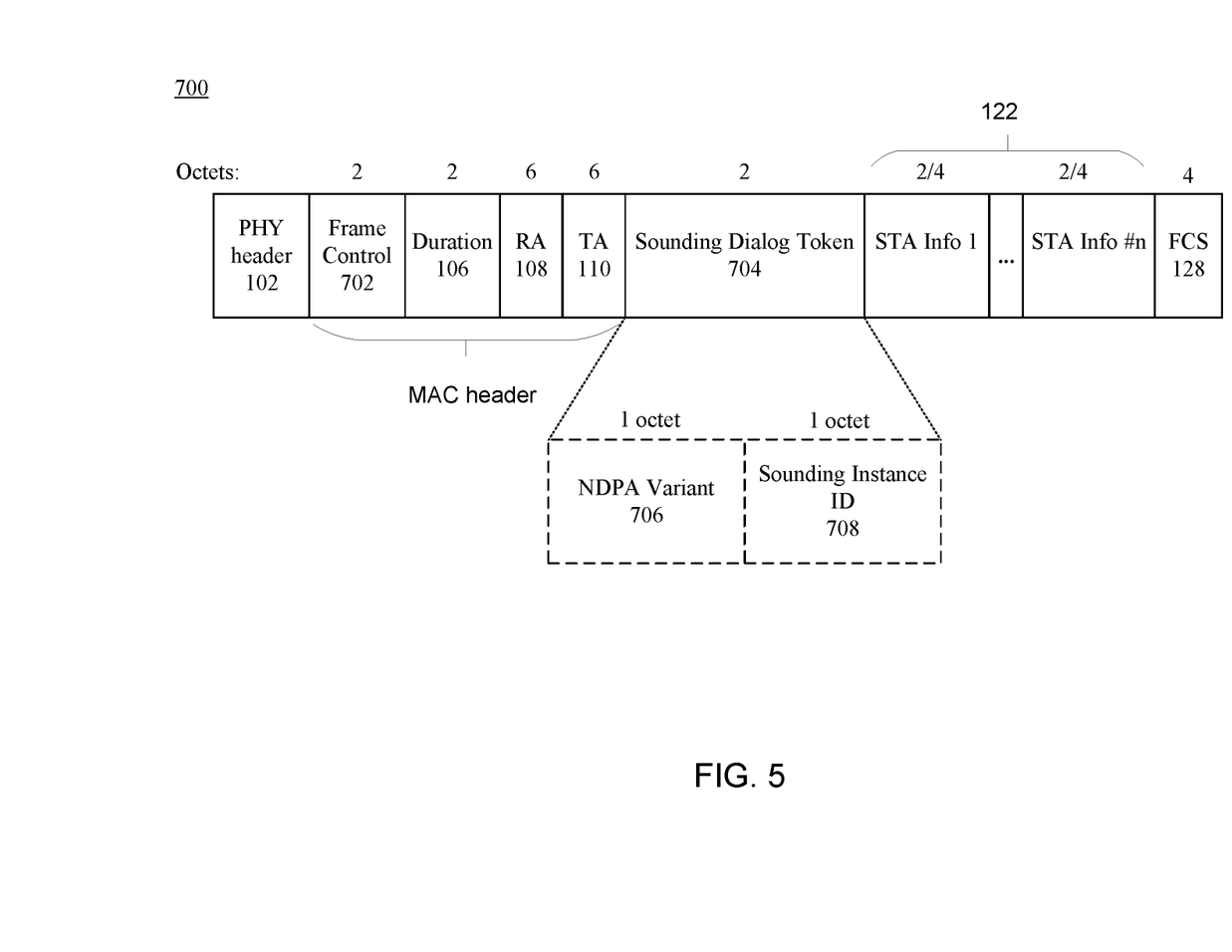
FIG. 5 illustrates another example of an enhanced NDPA frame format, according to an embodiment of the present disclosure.

FIG. 5 illustrates another example of an enhanced NDPA frame format, according to an embodiment of the present disclosure. The NDPA frame format 700 may comprise fields including one or more of PHY header field 102, frame control field 702, duration field 106, RA field 108, TA field 110, sounding dialog token field 704, one or more STA info fields 122, and FCS field 128, as illustrated.

As may be appreciated by a person skilled in the art, the 4-bit Subtype subfield of the frame control field 702 (in the MAC header) is running out of control frame subtypes. However, 3 frame control field subtypes: 0000, 0001 and 0010, are still reserved. Embodiments may provide for using one of these remaining reserved frame control subtypes to define an enhanced control frame. The enhanced control frame may be referred to as an "NDPA" control frame, e.g., NDPA frame format 700.

In an embodiment, the frame control field 702 may comprise a subtype value (via using one of the three served frame control field subtypes) for indicating an enhanced NDPA frame format 700. In some embodiments, the size of sounding dialog token field 704 may be 2 bytes (an increase of 1 byte compared to the sounding dialog token field 120 of FIG. 1). In this case, the sounding dialog token field can be referred to or renamed as the Common Field.

In some embodiments, the first byte (8 bits) in the sounding dialog token field 704 may be used to indicate an NDPA variant. In some embodiments, of the first 8 bits, one bit may be reserved for indicating an extension of the NDPA variant (thereby accommodating further extension for indicating the NDPA variant). In embodiments in which one bit (e.g., $8^{th}$ bit of the first 8 bits of the sounding dialog token field 704) is reserved for indicating an extension, then the remaining 7 bits (e.g., first 7 bits of the of the sounding dialog token field 704) may be used for indicating the NDPA variant. In some embodiments, the remaining 8 bits ($2^{nd}$ byte) of the sounding dialog token field 704 may be used for indicating a sounding dialog token number index.

In some embodiments, an alternative to the sounding dialog token field 704 may be an NDPA variant field 706 and a sounding Instance ID field 708, as illustrated in dashed lines. As such, in some embodiments, instead of the sounding dialog token field 704, the NDPA frame format 700 may comprise an 8-bit NDPA variant field 706 followed by an 8-bit sounding instance ID field 708, as illustrated. The NDPA variant field 706 may include a one bit TB/non-TB Sounding Indication bit 352 to allow an NDPA frame 700 to indicate if TB Sounding or non-TB Sounding is being used.

Figure 6:
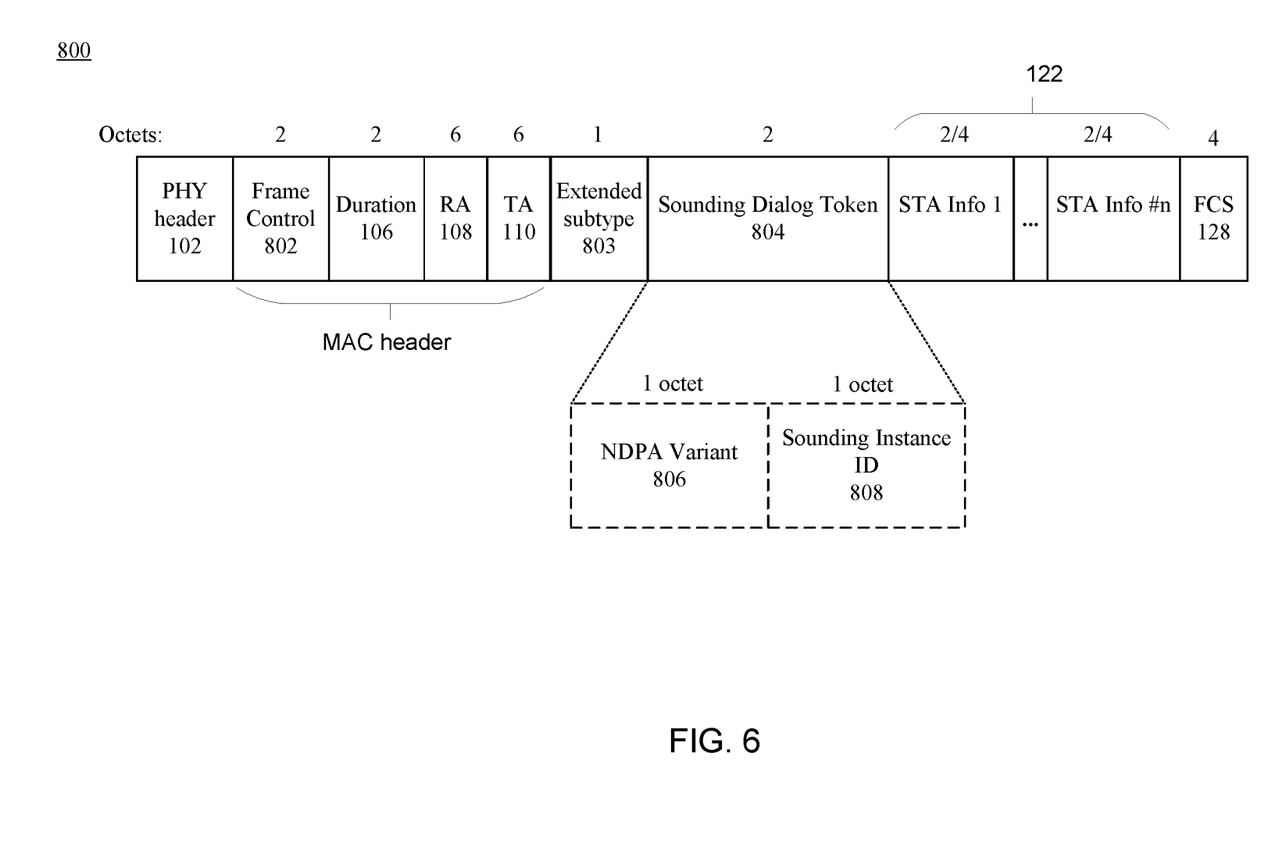
FIG. 6 illustrates another example of an enhanced NDPA frame format, according to an embodiment of the present disclosure.

FIG. 6 illustrates another example of an enhanced NDPA frame format, according to an embodiment of the present disclosure.

In some embodiments, a control frame extension may be used to define an enhanced NDPA control frame. As may be appreciated by a person skilled in the art, frame control field comprises a control subtype, e.g., control frame extension, for indicating future control frames. Embodiments may provide for using the control frame extension for creating a control frame for NDPA of future amendment variants.

The NDPA frame format 800 may comprise fields including one or more of PHY header field 102, frame control field 802, duration field 106, RA field 108, TA field 110, extended subtype field 803, sounding dialog token field 804, one or more STA info field 122, and FCS field 128, as illustrated.

The sounding dialog token field 804 of the NDPA frame format 800 may be similar to the sounding dialog token field 704 of the NDPA frame format 700. The NDPA variant field 806 may be similar to the NDPA variant field 706. The NDPA variant field 806 may include a one bit TB/non-TB Sounding Indication bit 352 to allow an NDPA frame 800 to indicate if TB Sounding or non-TB Sounding is being used. The sounding Instance ID field 808 may be similar to the sounding Instance ID field 708.

In some embodiments, the size of sounding dialog token field 804 may be 2 bytes. In some embodiments, the first byte (8 bits) in the sounding dialog token field 804 may be used to indicate an NDPA variant. In some embodiments, of the first 8 bits, one bit may be reserved for indicating an extension of the NDPA variant (thereby accommodating further extension for indicating the NDPA variant). In embodiments in which one bit (e.g., $8^{th}$ bit of the first 8 bits of the sounding dialog token field 804) is reserved for indicating an extension, then the remaining 7 bits (e.g., first 7 bits of the of the sounding dialog token field 804) may be used for indicating the NDPA variant.

In some embodiments, an alternative to the sounding dialog token field 804 may be an NDPA variant field 806 and a sounding Instance ID field 808, as illustrated in dashed lines. As such, in some embodiments, instead of the sounding dialog token field 804, the NDPA frame format 800 may comprise an 8-bit NDPA variant field 806 followed by an 8-bit sounding Instance ID field 808, as illustrated. The NDPA variant field 806 may include a one bit TB/non-TB Sounding Indication bit 352 to allow an NDPA frame 800 to indicate if TB Sounding or non-TB Sounding is being used.

Figure 7:
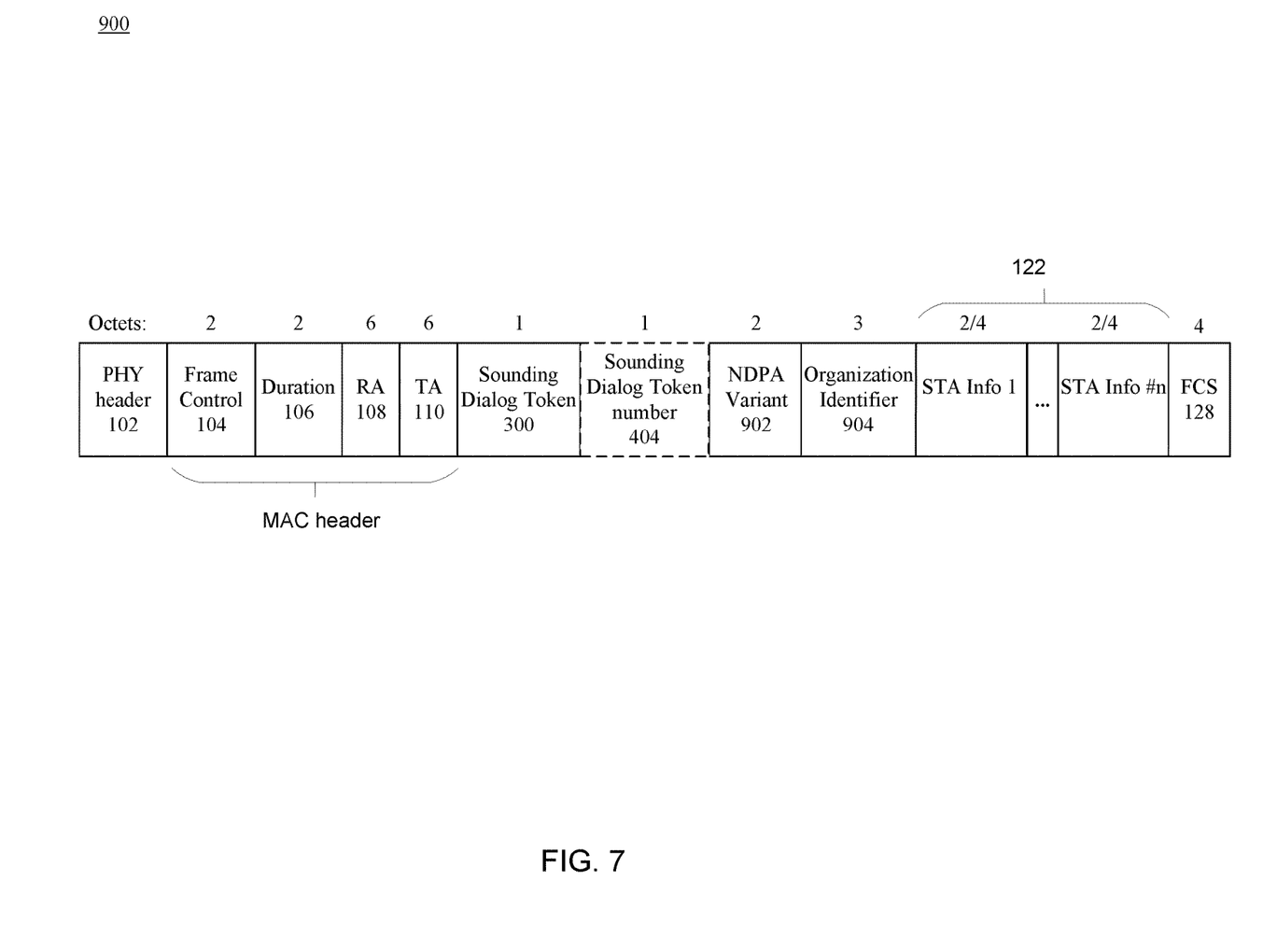
FIG. 7 illustrates an example of vendor specific NDPA frame extension, according to an embodiment of the present disclosure.

FIG. 7 illustrates an example of vendor specific NDPA frame extension, according to an embodiment of the present disclosure. NDPA frame format 900 may be similar to NDPA frame format 400, however, the Pt octet of the NDPA variant field 902 may include a one bit TB/non-TB Sounding Indication bit 352 to allow an NDPA frame 900 to indicate if TB Sounding or non-TB Sounding is being used.

Figure 8:
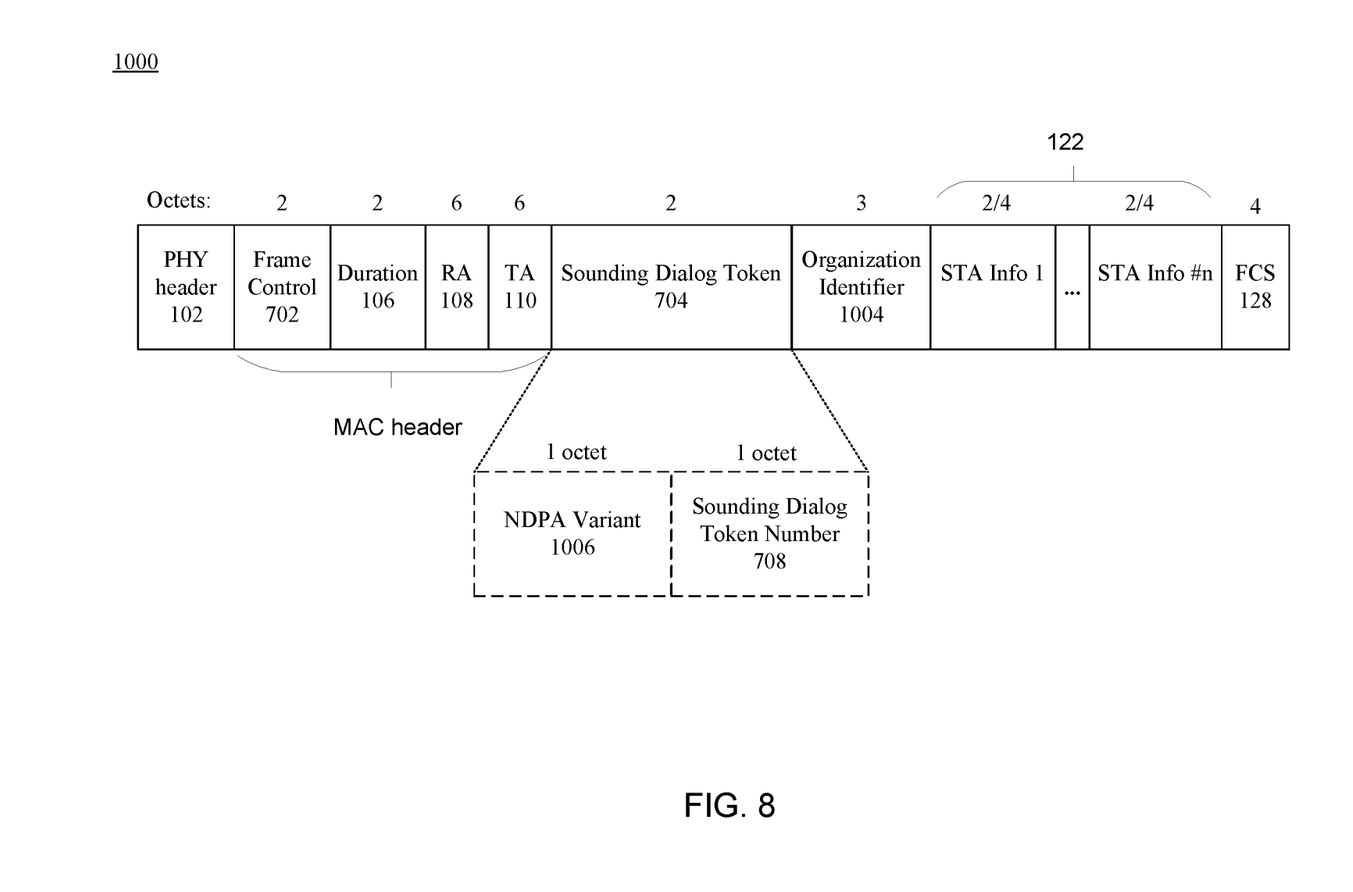
FIG. 8 illustrates another example of vendor specific NDPA frame extension, according to an embodiment of the present disclosure.

FIG. 8 illustrates another example of vendor specific NDPA frame extension, according to an embodiment of the present disclosure. The NDPA frame format 1000 may be similar to NDPA frame format 700, however, the Pt octet of the sounding dialog token 704 or the Pt octet of the NDPA variant field 1006 may be used to indicate a vendor specific extension. As discussed in reference to FIG. 5, in some embodiments, the sounding dialog token field 704 may be replaced by the NDPA variant field 1006 and the sounding Instance ID field 708. The NDPA variant field 1006 may include a one bit TB/non-TB Sounding Indication bit 352 to allow an NDPA frame 1000 to indicate if TB Sounding or non-TB Sounding is being used.

Figure 9:
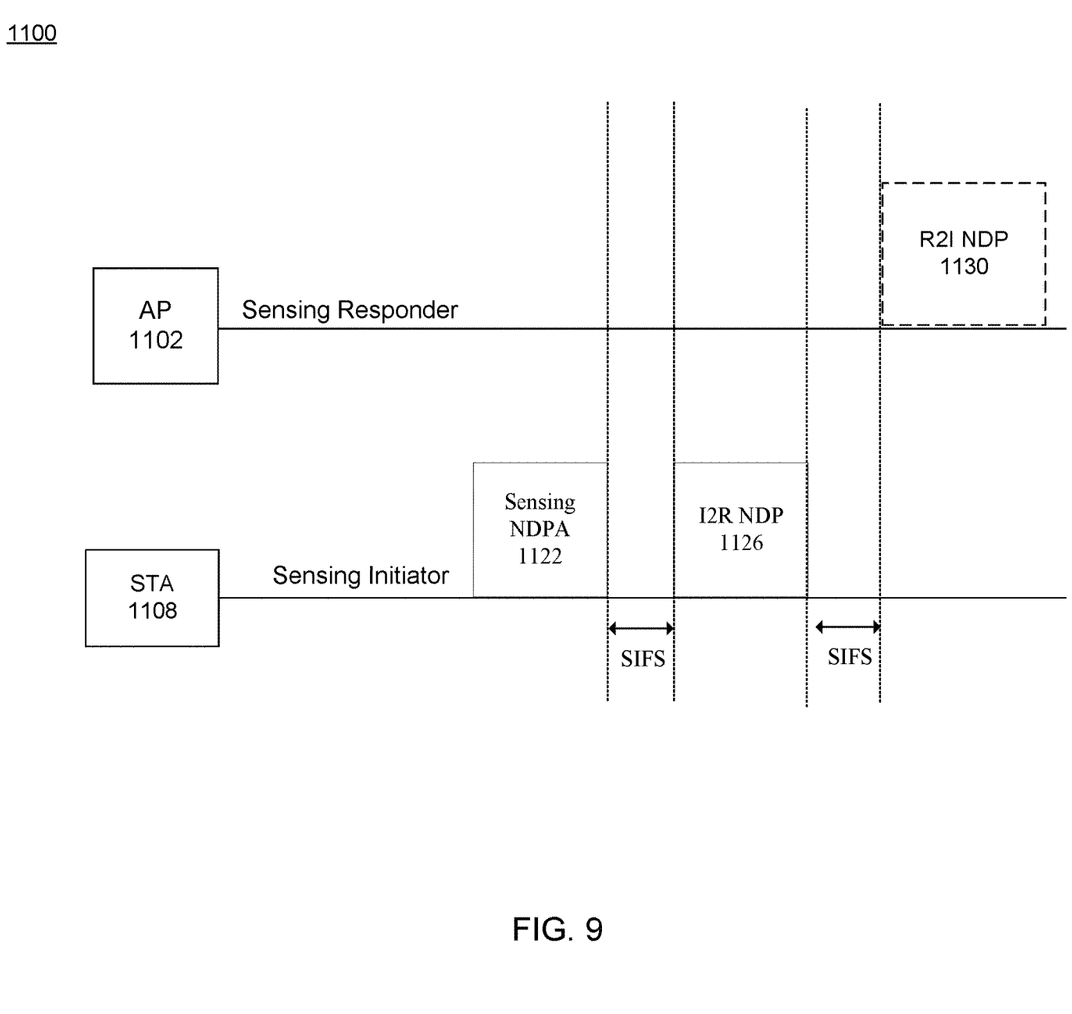
FIG. 9 illustrates a non-TB sensing sounding procedure, according to an embodiment of the present disclosure.

FIG. 9 illustrates a non-TB sensing sounding procedure, according to an embodiment of the present disclosure. The procedure 1100 may be between an access point (AP) 1102 and a stations (STAs) 1108. While one AP 1102 is illustrated, a person skilled in the art may appreciate that a plurality of APs may be involved in the procedure 1100. In the procedure 1100, AP 1102 may be considered the "sensing responder" and STA 1108 may be considered to be the "sensing initiator."

In an embodiment, STA 1108 may send a sensing NDPA frame 1122 that may be received by AP 1102. NDPA frame 1122 may correspond to an NDPA frame format 100, 400, 700, 800, 900, or 1000 as described herein. NDPA frame 1122 may include a TB/non-TB sounding indication bit 352 indicating that non-TB sensing sounding procedure is being used. Shortest interframe spacing (SIFS) time units after sending the NDPA 1122, STA 1108 may send initiator to responder (I2R) NDP frame 1126. Shortest interframe spacing (SIFS) time units after sending the NDP 1126, AP may respond with a responder to initiator (R2I) NDP frame 1130 to complete the procedure.

Figure 10:
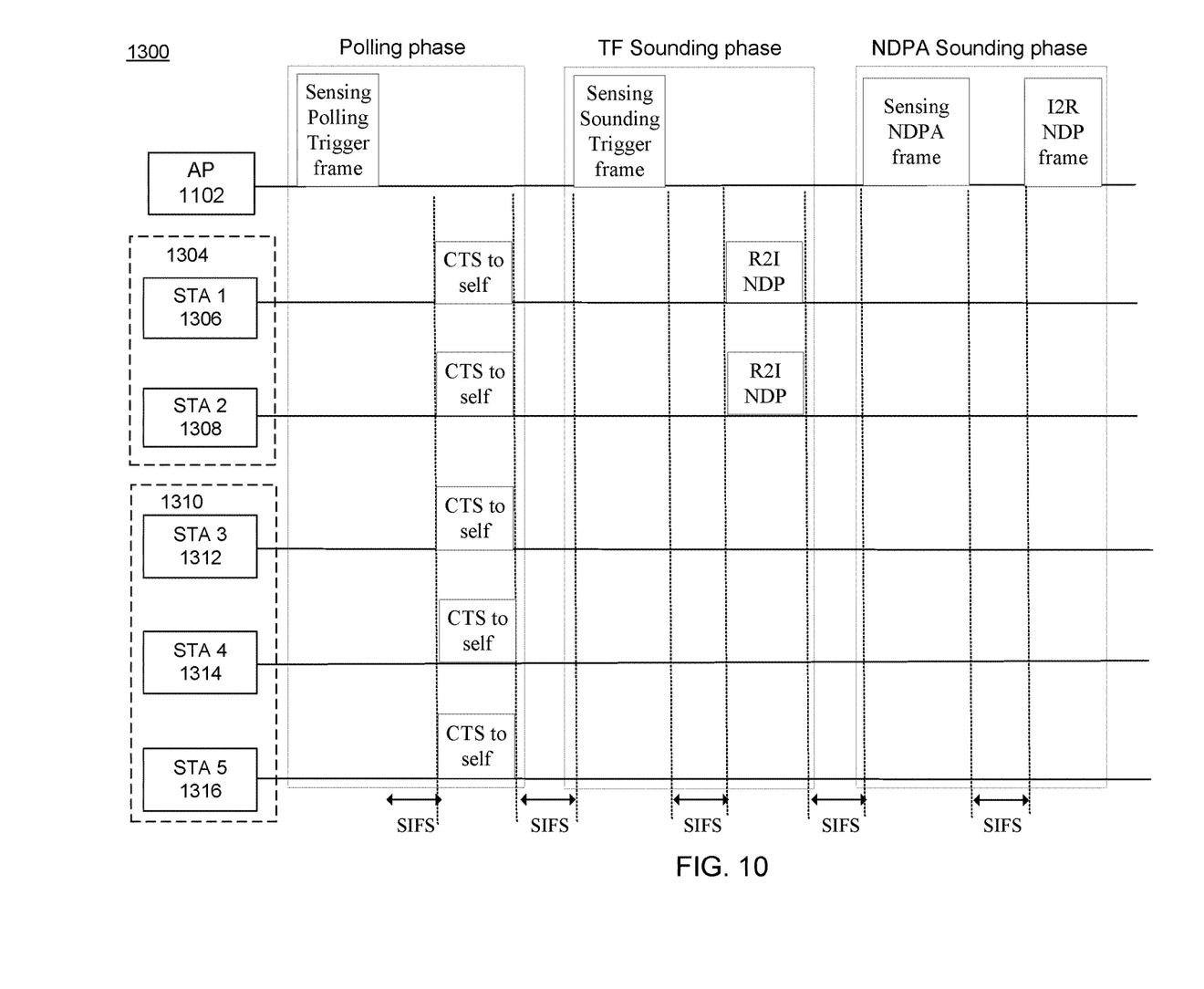
FIG. 10 illustrates a TB sensing sounding procedure, according to an embodiment of the present disclosure.

FIG. 10 illustrates a TB sensing sounding procedure, according to an embodiment of the present disclosure. The procedure 1300 may be between an access point (AP) 1102 and one or more stations (STAs). STAs may include a group of sensing transmitters 1304 that includes sensing responder STA1 1306 and STA2 1308. STAs may also include a group of sensing receivers 1310 that includes sensing responders STAs STA3 1312, STA4 1314, and STA5 1316. While one AP 1102 is illustrated, a person skilled in the art may appreciate that a plurality of APs may be involved in the procedure 1300. In procedure 1300, a TB/non-TB sounding indication bit 352 indicating that a TB sensing sounding procedure is being used.

In a polling phase, AP 1102 may send a sensing polling trigger frame. A gap of shortest interframe spacing (SIFS) time units may occur between transmissions from AP 1102, and the groups of STAs and each STA may respond by sending a clear to send (CTS) frame. In a TF sounding phase, AP 1102 may send a sensing sounding trigger frame and sensing transmitter 1304 STA1 1306 and STA2 1308 may respond with an R2I NDP frame. In an NDPA sounding phase, AP 1102 may send a sensing NDPA frame and following SIFS time units, send an I2R NDP frame.

Figure 11:
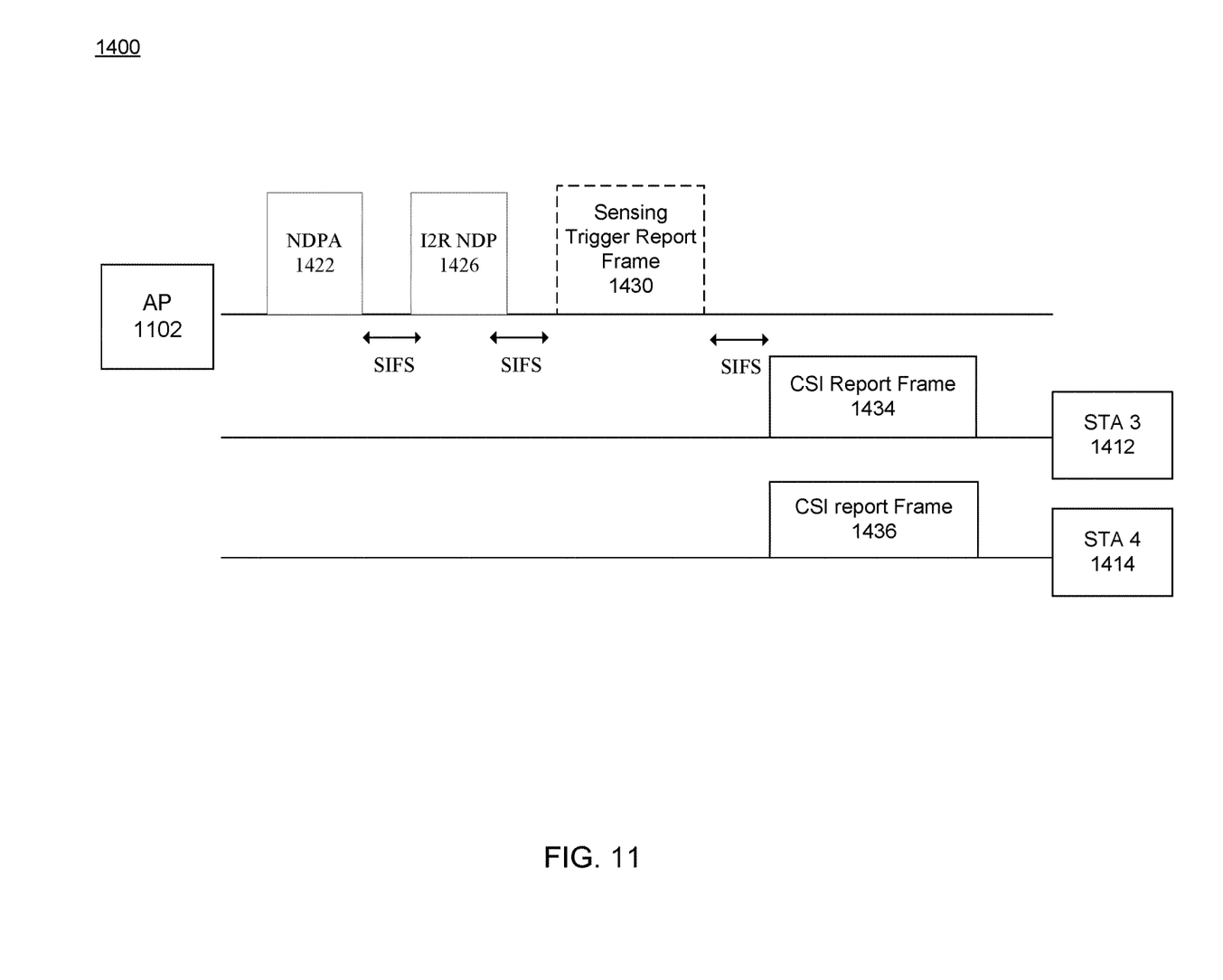
FIG. 11 illustrates a detailed view of an NDPA sounding phase, according to an embodiment of the present disclosure.

FIG. 11 illustrates a detailed view of an NDPA sounding phase, according to an embodiment of the present disclosure. An AP 1102 sends an NDPA frame 1422, which may include a TB/non-TB sounding indication bit 352 indicating that a TB sensing sounding procedure or a non-TB sounding procedure is being used. AP 1102 may then send an I2R NDP frame 1426 and then a Sensing Trigger Report Frame 1430. STA3 1412 and STA4 1414 may then respond with CSI Report frame 1434 and CSI Report frame 1436, respectively.

Figure 12:
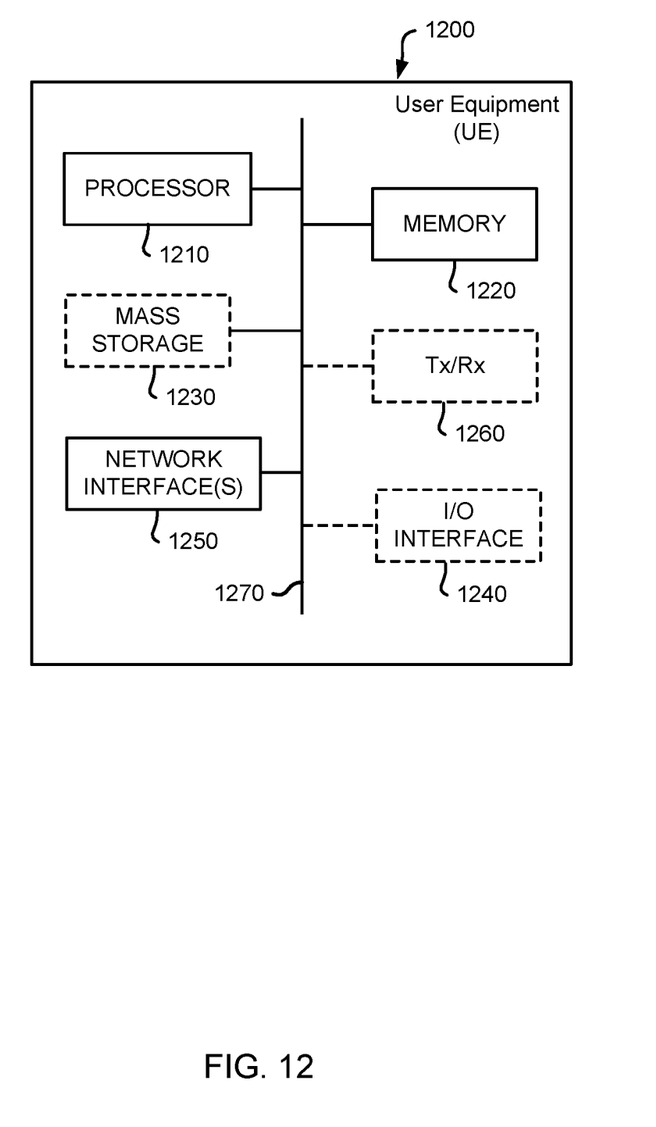
FIG. 12 is a schematic diagram of an electronic device that may perform any or all of operations of the above methods and features explicitly or implicitly described herein, according to different embodiments of the present invention.

FIG. 12 is a schematic diagram of an electronic device 1200 that may perform any or all of operations of the above methods and features explicitly or implicitly described herein, according to different embodiments of the present invention. For example, a computer equipped with network function may be configured as electronic device 1200. In some embodiments, the electronic device 1200 may be a user equipment (UE), an AP, a STA, or the like as appreciated by a person skilled in the art.

As shown, the electronic device 1200 may include a processor 1210, such as a Central Processing Unit (CPU) or specialized processors such as a Graphics Processing Unit (GPU) or other such processor unit, memory 1220, non-transitory mass storage 1230, input-output interface 1240, network interface 1250, and a transceiver 1260, all of which are communicatively coupled via bi-directional bus 1270. According to certain embodiments, any or all of the depicted elements may be utilized, or only a subset of the elements. Further, electronic device 1200 may contain multiple instances of certain elements, such as multiple processors, memories, or transceivers. Also, elements of the hardware device may be directly coupled to other elements without the bi-directional bus. Additionally, or alternatively to a processor and memory, other electronics, such as integrated circuits, may be employed for performing the required logical operations.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method operations described above.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, personal digital assistant (PDA), or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disc read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method of acquiring channel-state information from one or more stations, the method comprising:
   sending, by an access point (AP) to one or more stations (STAs), a request for channel state information (CSI), the request comprising a null data packet announcement (NDPA) frame including a NDPA variant field for indicating information that is common to the one or more STAs, the NDPA variant field including an indicator for indicating whether trigger based (TB) sounding or non-trigger based (non-TB) sounding is being used;
   when the indicator indicates non-TB sounding is being used, after a shortest interframe spacing (SIFS) time unit, sending, by the AP to the one or more STAs, an initiator to responder (I2R) null data packet (NDP) frame,
   after a second SIFS time unit, sending, by the AP to the one or more STAs, a sensing trigger report frame; and
   receiving, by the AP from the one or more STAs, a CSI feedback response based on the request.

2. The method of claim 1, wherein the indicator indicates that a non-TB sounding is being used and the NDPA variant field includes a transmit (Tx) power parameter.

3. The method of claim 1, wherein the indicator indicates that a non-TB sounding is being used and the NDPA variant field includes a feedback bandwidth parameter.

4. The method of claim 1, wherein the indicator utilizes 1 bit.

5. An apparatus comprising:
   at least one processor and at least one machine-readable medium storing executable instructions which when executed by the at least one processor configure the apparatus for:
   sending, by an access point (AP) to one or more stations (STAs), a request for channel state information (CSI), the request comprising a null data packet announcement (NDPA) frame including a NDPA variant field for indicating information that is common to the one or more STAs, the NDPA variant field including an indicator for indicating whether trigger based (TB) sounding or non-trigger based (non-TB) sounding is being used;
   when the indicator indicates non-TB sounding is being used, after a shortest interframe spacing (SIFS) time unit, sending, by the AP to the one or more STAs, an initiator to responder (I2R) null data packet (NDP) frame,
   after a second SIFS time unit, sending, by the AP to the one or more STAs, a sensing trigger report frame; and
   receiving, by the AP from the one or more STAs, a CSI feedback response based on the request.

6. The apparatus of claim 5, wherein the indicator indicates that a non-TB sounding is being used and the NDPA variant field includes a transmit (Tx) power parameter.

7. The apparatus of claim 5, wherein the indicator indicates that a non-TB sounding is being used and the and the NDPA variant field includes a feedback bandwidth parameter field includes a feedback bandwidth parameter.

8. The apparatus of claim 5, wherein the indicator utilizes 1 bit.

9. A non-transitory computer-readable medium storing executable instructions which when executed by a processor of a device configure the device for:
   sending, by an access point (AP) to one or more stations (STAs), a request for channel state information (CSI), the request comprising a null data packet announcement (NDPA) frame including a NDPA variant field for indicating information that is common to the one or more STAs, the NDPA variant field including an indicator for indicating whether trigger based (TB) sounding or non-trigger based (non-TB) sounding is being used;
   when the indicator indicates non-TB sounding is being used, after a shortest interframe spacing (SIFS) time unit, sending, by the AP to the one or more STAs, an initiator to responder (I2R) null data packet (NDP) frame,
   after a second SIFS time unit, sending, by the AP to the one or more STAs, a sensing trigger report frame; and
   receiving, by the AP from the one or more STAs, a CSI feedback response based on the request.

10. The non-transitory computer-readable medium of claim 9, wherein the indicator indicates that a non-TB is being used and the NDPA variant field includes a transmit (Tx) power parameter.

11. The non-transitory computer-readable medium of claim 9, wherein the indicator indicates that a non-TB sounding is being used and the NDPA variant field includes a feedback bandwidth parameter.

12. The non-transitory computer-readable medium of claim 9, wherein the indicator utilizes 1 bit.

* * * * *